(12) United States Patent
Park (10) Patent No.: US 8,345,625 B2
(45) Date of Patent: Jan. 1, 2013

(54) APPARATUS AND METHOD OF HANDOVER FOR MOBILE NODE

(75) Inventor: Soo-hong Park, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 489 days.

(21) Appl. No.: 11/694,175

(22) Filed: Mar. 30, 2007

(65) Prior Publication Data

US 2007/0249348 A1 Oct. 25, 2007

(30) Foreign Application Priority Data

Apr. 21, 2006 (KR) .................. 10-2006-0036342

(51) Int. Cl.
*H04W 4/00* (2009.01)

(52) U.S. Cl. ........ 370/331; 370/338; 370/389; 370/401; 370/465; 370/466; 455/436; 455/442

(58) Field of Classification Search .................. 370/331, 370/310, 338, 464, 466, 465, 351–356, 389, 370/401; 455/436, 442
See application file for complete search history.

(56) References Cited

U.S. PATENT DOCUMENTS

| | | | |
|---|---|---|---|
| 7,047,001 B2* | 5/2006 | Chen | 455/422.1 |
| 7,298,743 B2* | 11/2007 | Markki et al. | 370/392 |
| 7,443,880 B2* | 10/2008 | Wetterwald et al. | 370/466 |
| 7,463,614 B2* | 12/2008 | Bhatia et al. | 370/338 |
| 7,545,754 B2* | 6/2009 | Funato et al. | 370/254 |
| 7,698,463 B2* | 4/2010 | Ogier et al. | 709/242 |
| 7,729,312 B2* | 6/2010 | Suzuki et al. | 370/331 |
| 2002/0126642 A1* | 9/2002 | Shitama | 370/338 |
| 2003/0227911 A1* | 12/2003 | Trossen | 370/352 |
| 2003/0237002 A1* | 12/2003 | Oishi et al. | 713/201 |
| 2004/0004967 A1* | 1/2004 | Nakatsugawa et al. | 370/400 |
| 2004/0100951 A1* | 5/2004 | O'neill | 370/389 |
| 2004/0136348 A1 | 7/2004 | Han | |

(Continued)

FOREIGN PATENT DOCUMENTS

EP 1524806 4/2005

(Continued)

OTHER PUBLICATIONS

Jordan, N., et al., "Link-Layer Support for Fast Mobile IPv6 Handover in Wireless LAN based Networks", Local and Metropolitan Area Networks, 2004, the 13th IEEE Workshop on Apr. 25-28, 2004, pp. 139-143.

(Continued)

*Primary Examiner* — Kamran Afshar
*Assistant Examiner* — Mong-Thuy Tran
(74) *Attorney, Agent, or Firm* — Staas & Halsey LLP (57) ABSTRACT

Provided are an efficient handover apparatus and method in a mobile node. In the method in which a handover is performed in a mobile node which establishes a data communication through a point of attachment (PoA), the method including receiving information regarding capabilities of a new PoA; determining whether Internet protocol version 6 (IPv6) prefix is available at the new PoA, based on the information regarding the capabilities of the new PoA; and generating an address which is to be used by the mobile node in a data communication with the new PoA, according to a method determined based on whether IPv6 prefix is available at the new PoA. Thus, it is possible to determine whether IPv6 prefix is available at a new point of attachment prior to receiving a router advertisement (RA) message.

19 Claims, 5 Drawing Sheets

U.S. PATENT DOCUMENTS

| | | | |
|---|---|---|---|
| 2004/0264474 A1* | 12/2004 | Sbida | 370/395.5 |
| 2005/0018677 A1* | 1/2005 | Lee et al. | 370/389 |
| 2005/0071627 A1* | 3/2005 | Montenegro et al. | 713/151 |
| 2005/0163078 A1* | 7/2005 | Oba et al. | 370/331 |
| 2005/0226189 A1* | 10/2005 | Janneteau et al. | 370/338 |
| 2005/0265360 A1* | 12/2005 | Kim et al. | 370/400 |
| 2006/0018296 A1* | 1/2006 | Muraoka et al. | 370/338 |
| 2006/0029020 A1* | 2/2006 | Jung et al. | 370/331 |
| 2006/0056369 A1* | 3/2006 | Morishige et al. | 370/338 |
| 2006/0062176 A1 | 3/2006 | Ikemura et al. | |
| 2006/0159100 A1* | 7/2006 | Droms et al. | 370/395.2 |
| 2006/0179480 A1* | 8/2006 | Jardin et al. | 726/15 |
| 2006/0227746 A1* | 10/2006 | Kim et al. | 370/331 |
| 2006/0268782 A1* | 11/2006 | Kwak et al. | 370/331 |
| 2006/0274743 A1* | 12/2006 | Yegin et al. | 370/389 |
| 2006/0280146 A1* | 12/2006 | Koodli et al. | 370/331 |
| 2007/0008906 A1 | 1/2007 | Han et al. | |
| 2007/0104143 A1 | 5/2007 | Hori | |
| 2007/0189219 A1* | 8/2007 | Navali et al. | 370/331 |
| 2008/0004018 A1 | 1/2008 | Adachi et al. | |
| 2009/0135758 A1* | 5/2009 | Alper et al. | 370/328 |

FOREIGN PATENT DOCUMENTS

| | | |
|---|---|---|
| JP | 2003-18185 | 1/2003 |
| JP | 2003-289306 | 10/2003 |
| JP | 2004-080791 | 3/2004 |
| JP | 2006-87039 | 3/2006 |
| KR | 2002-0023918 | 3/2002 |
| KR | 10-2005-0065990 | 6/2005 |
| KR | 10-2005-0128638 | 12/2006 |
| KR | 10-2006-0134770 | 12/2006 |
| RU | 2 224 374 | 2/2004 |
| RU | 2005102487 A | 7/2005 |
| WO | 2005/053250 A1 | 6/2005 |

OTHER PUBLICATIONS

IEEE 802.21 MIH Services (Proposal for 802.21, 21, 21-05-0298-01-0000-Section5-Draft1.doc (http://www.ieee802.org/21)), Jul. 11, 2005.

PCT International Search Report and Written Opinion issued in International Application No. PCT/KR2007/001689 issued Jul. 23, 2007.

U.S. Office Action mailed Nov. 19, 2009 in related U.S. Appl. 11/695,656.

U.S. Final Office Action in related U.S. Appl. 11/695,656; mailed Apr. 13, 2010.

Russian Office Action issued Jun. 7, 2010 in corresponding Russian Patent Application 2008141285.

U.S. Appl. No. 11/695,656, filed Apr. 3, 2007, Soo-Hong Park Samsung Electronics Co., Ltd.

Final Office Action dated Jan. 20, 2011 for related U.S. Appl. No. 11/695,656.

Advisory Action dated Jun. 25, 2010 for related U.S. Appl. No. 11/695,656.

Office Action dated Sep. 16, 2009 for related U.S. Appl. No. 11/695,656.

Korean Notice of Allowance for corresponding Korean Patent Application No. 10-2006-0036342 dated May 29, 2007.

Advisory Action dated Nov. 18, 2011 for related U.S. Appl. No. 11/695,656.

Japanese Office Action issued Jan. 31, 2012 in corresponding Japanese Patent Application 2009-506402.

Final Office Action dated Jul. 28, 2011 for related U.S. Appl. No. 11/695,656.

* cited by examiner

| Type | Description | Length | Value |
|---|---|---|---|
| TYPE_IE_POA_CAPABILITIES | PoA Capabilities | 4 octets | PoA Capabilities bitmap<br><br>Bit 0: Security Y/N<br>Bit 1: QoS Y/N<br>Bit 2: Internet Access Y/N<br>Bit 3: IP Version 4 Y/N<br>Bit 4: IP Version 6 Y/N — 300<br>Bit 5: IP Version 6 Prefix Available Y/N — 310<br>Bit 6: Emergency Services Y/N<br>Bit 7-31: Reserved |

APPARATUS AND METHOD OF HANDOVER FOR MOBILE NODE

CROSS-REFERENCE TO RELATED APPLICATIONS

This application claims the benefit of Korean Patent Application No. 2006-36342, filed on Apr. 21, 2006 in the Korean Intellectual Property Office, the disclosure of which is incorporated herein by reference.

BACKGROUND OF THE INVENTION

1. Field of the Invention

Aspects of the present invention relate to mobile communications, and more particularly, to a handover in a mobile node.

2. Description of the Related Art

Advancements in communication technology have resulted in several types of communication networks. Typical examples of communication networks include Wireless Local Area Network (WLAN) links based on the institute of Electrical and Electronics Engineers (IEEE) 802.11 standard, the IEEE 802.15 standard, and the IEEE 802.16 standard; and cellular links based on the 3rd Generation Partnership Project (3GPP) and 3GPP2. Mobile nodes including different types of link interfaces to allow connection to various links have been introduced. A standard (IEEE 802.21) to support handovers between the various types of links has been established as well.

The IEEE 802.21 standard supports a media-independent handover (MIH) between various links. The IEEE 802.21 standard presently under discussion specifies, among other things, a Point of Attachment (PoA) capabilities information element (IE) to deliver PoA capabilities information to a mobile node. The PoA capabilities IE represents the security for and the quality of service (QoS) of a PoA, whether the PoA supports Internet Protocol (IP) version 4 (IPv4) or IP version 6 (IPv6).

Even if the PoA supports IPv6, it is important to learn beforehand whether a mobile node will use an IPv6 prefix to generate an address to be used for communication with the PoA. However, the IEEE 802.21 standard currently under discussion does not consider this issue. Accordingly, when following the current standard, use of a router solicitation (RS) message or a router advertisement (RA) message causes delays in generating an IPv6 address.

SUMMARY OF THE INVENTION

Aspects of the present invention provide an apparatus and method for effectively performing a handover by delivering information regarding whether an IPv6 prefix is available between a Point of Attachment (PoA) and a mobile node.

Aspects of the present invention also provide a computer readable medium having recorded thereon a computer program for the handover method.

According to an aspect of the present invention, there is provided a method of performing a handover in a mobile node which establishes a data communication through a point of attachment (PoA), the method comprising receiving information regarding capabilities of a new PoA; determining whether an Internet protocol version 6 (IPv6) prefix is available at the new PoA, based on the information regarding the capabilities of the new PoA; and generating an address to be used by the mobile node in a data communication with the new PoA, based on whether an IPv6 prefix is available at the new PoA.

According to another aspect of the present invention, there is provided an apparatus to perform a handover in a mobile node which establishes a data communication through a point of attachment (PoA), the apparatus comprising a PoA information receiving unit to receive information regarding capabilities of a new PoA; a PoA capabilities determination unit to determine whether an IPv6 prefix is available at the new PoA, based on the information regarding the capabilities of the new PoA; and an address generator to generate an address to be used by the mobile node in a data communication with the new PoA, based on whether IPv6 prefix is available at the new PoA.

According to another aspect of the present invention, there is provided a method of providing information about a handover from an information server to a mobile node, the method comprising transmitting information to the mobile node from the information server, wherein the information regards capabilities of a new point of attachment (PoA), to which the mobile node is to be connected, and wherein the mobile node generates an address to be used in a data communication with the new PoA, based on the information regarding the capabilities of the new PoA.

According to another aspect of the present invention, there is provided an information server to provide information regarding a handover to a mobile node, the information server comprising a point of attachment (PoA) information transmitting unit to transmit information regarding capabilities of a new PoA to the mobile node, wherein the mobile node generates an address to be used in a data communication with the new PoA based on the information regarding the capabilities of the new PoA.

According to another aspect of the present invention, there is provided an information storage medium having recorded thereon computer-executed instructions to perform a method comprising receiving a message comprising information regarding capabilities of a new point of attachment (PoA) and performing a handover based on the message, wherein the message comprises a PoA capabilities information element containing the information regarding the capabilities of the new PoA.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
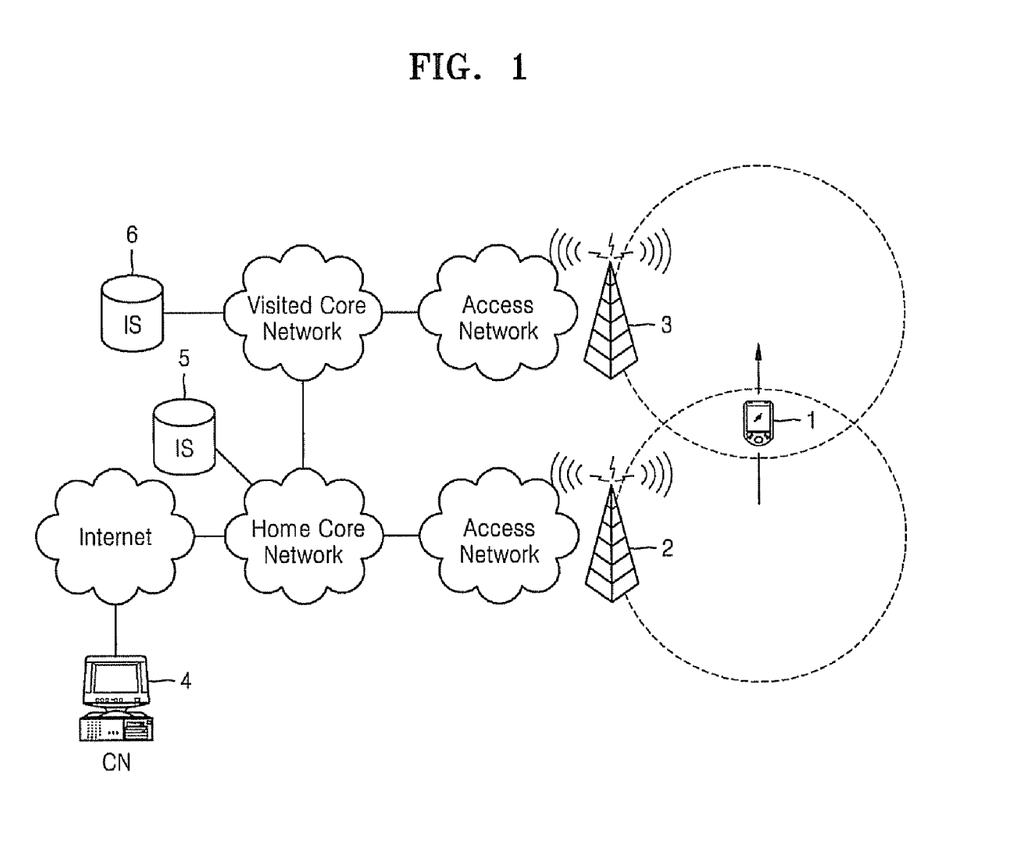
FIG. 1 is a diagram of a mobile communication environment according to an embodiment of the present invention.

FIG. 1 is a diagram illustrating a mobile communication environment according to an embodiment of the present invention. Referring to FIG. 1, the mobile communication environment includes a mobile node (MN) 1, a plurality of points of attachment (PoAs) 2 and 3, a corresponding node (CN) 4, information servers (ISs) 5 and 6, and a plurality of networks. However, it would be apparent to those of ordinary skill in the art that the network topology illustrated in FIG. 1 is not limited thereto and can be constructed in many possible ways.

The mobile node 1 is a mobile terminal that uses the mobile communication environment. When starting mobile communication, the mobile node 1 registers a home address (HoA) with a home agent in a home network. When moving to a new network, the mobile node 1 obtains a Care of Address (CoA) from a foreign agent (FA) in the new network. The mobile node 1 delivers the CoA to the home agent so as to register the CoA with the home agent. The home agent then matches the CoA and the HoA with each other.

The corresponding node 4 must learn the address of the mobile node 1 in order to transmit data to the mobile node 1. Since the corresponding node 4 knows the HoA, the corresponding node 4 transmits data by setting the HoA as a target address. The home agent receives the data with the HoA as the target address. The home knows the CoA corresponding to the HoA and thus forwards the data to the mobile node 1 by setting the CoA as the target address. The data is delivered to the mobile node 1 via the network.

A PoA (such as PoA 2) connects the mobile node 1 to the network. Examples of PoAs include access points (AP) and a base stations (BS), but they are not limited thereto. The PoA may be any device that can allow data exchange between the mobile node 1 and the network.

When the mobile node 1 moves to another network, a handover is performed. A handover process will now be described with reference to FIG. 1. As illustrated in FIG. 1, while communicating with the network via the PoA 2, the mobile node 1 moves to an area where a data communication with the network is established via the PoA 3.

The mobile node 1 receives information regarding the PoA 3 (a new PoA) via the PoA 2 (a current PoA.) The information regarding the PoA 3 may be received from the information servers 5 and 6 or directly from the PoA 3. The mobile node 1 can recognize from the received information which protocol the PoA 3 (the new PoA) uses and which service the PoA 3 supports, and prepare accordingly.

During the handover process, it is important to set the CoA, the address that the mobile node 1 will use in a new network. In general, addresses, such as a CoA, are set by receiving a router advertisement (RA) message containing network information from a PoA and using the RA message to set an address. However, for effective use of network bandwidth, an RA message is transmitted after a certain amount of time. Thus, a delay (RA delay) occurs in receiving the RA message. A router solicitation (RS) message requesting transmission of the RA message may be transmitted to a PoA. Even if the transmission of the RS message reduces the RA delay, there is still a delay (RS delay) between the time when the RS message is transmitted and the time when the RA message is received.

IPv6 supports automatic address configuration and uses a 128-bit address. The PoA generally inserts 64-bit network information into the RA message and transmits the RA message. The 64-bit network information is the upper 64 bits of the IPv6 address, which is referred to as the "IPv6 prefix." The mobile node 1 generates the lower 64 bits of the IPv6 address from unique information of the mobile node 1. Thus, the 64-bit network information contained in the RA message and the 64-bit address generated by the mobile node 1 are combined to generate a 128-bit IPv6 address. This process is referred to as automatic address configuration.

However, even if the PoA supports IPv6, automatic address configuration using the IPv6 prefix may not be supported. In this case, the RA message does not contain an IPv6 prefix, and thus, the mobile node 1 must generate an address using another technique. For example, the mobile node may use Dynamic Host Configuration Protocol (DHCP), or an address that has been predetermined by a user. The DHCP to generate IPv6 addresses is referred to as "DHCP version 6 (DHCPv6)." Hereinafter, when a connection is established to a PoA that does not support IPv6 prefixes, various techniques to generate an address, other than automatic address configuration, will be referred to as "DHCPv6." However, other aspects of the present invention may employ different techniques to generate an IPv6 address for the mobile node 1.

If the mobile node 1 can recognize beforehand that the PoA does not support IPv6 prefixes, the mobile node 1 can prepare to perform DHCPv6 immediately without waiting for an RA message. The mobile node 1 also need not transmit an RS message. As a result, it is possible to prevent unnecessary RA or RS delays.

Figure 2:
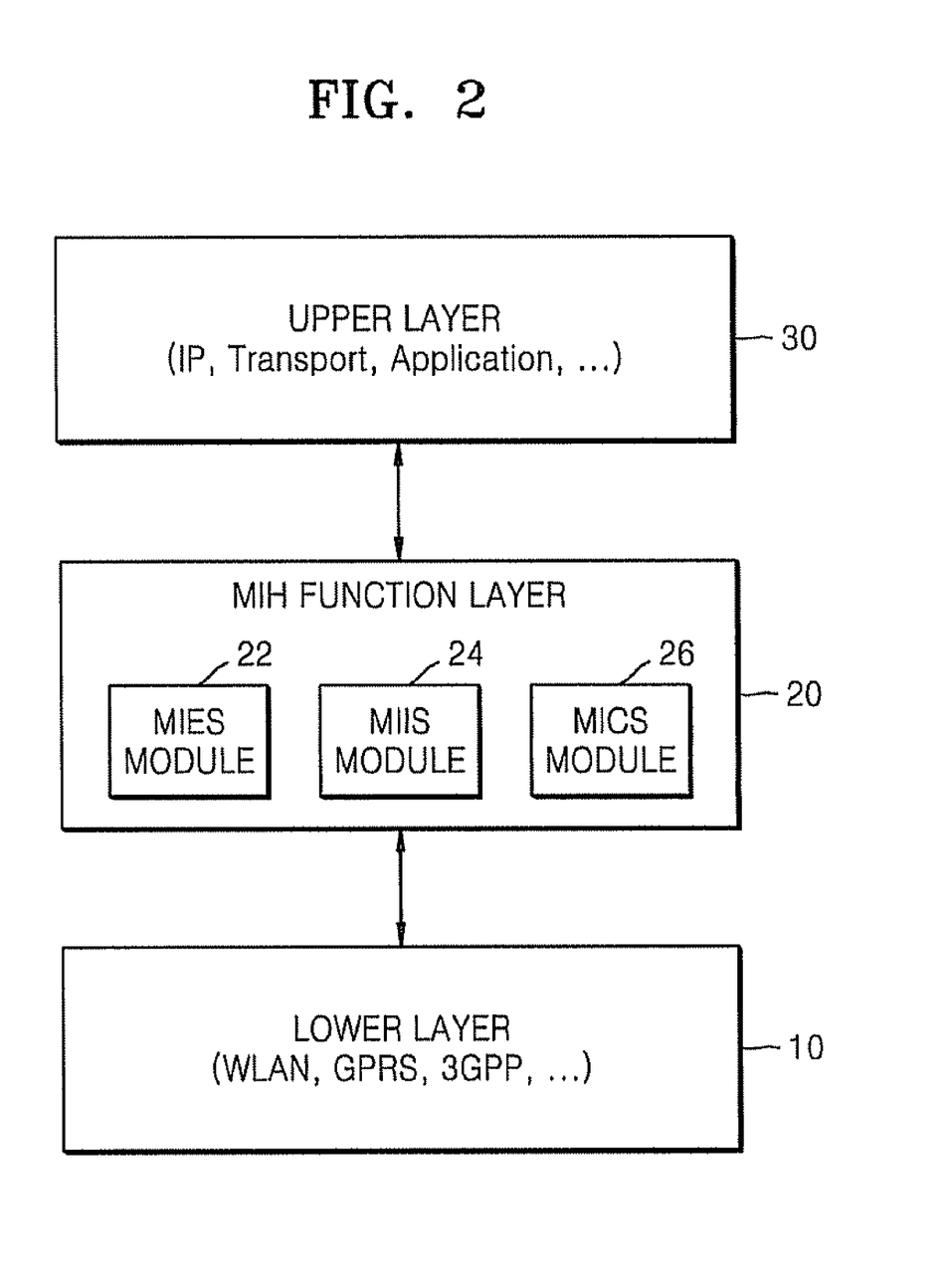
FIG. 2 is a block diagram of network layers of a mobile node according to an embodiment of the present invention.

FIG. 2 is a block diagram of network layers of a mobile node according to an embodiment of the present invention. The network layers include a lower layer 10, a MIH function layer 20, and an upper layer 30. The lower layer 10 includes a second layer and the lower layers defined by the Open Systems Interconnection (OSI) reference model (the link layer and the physical layer). The upper layer 30 includes a third layer and the upper layers defined by the OSI reference model: the Internet Protocol (IP) layer, a mobile IP layer, the transport layer, and the application layer.

The MIH function layer 20 is not defined by the OSI reference model. Instead, the MIH function layer 20 is defined according to the IEEE 802.21 standard. The MIH function layer 20 is a 2.5 layer between the lower layer 10 and the upper layer 30 and supports a handover in the lower layer 10 and the upper layer 30.

The MIH function layer 20 supports a handover between different links, without regard to the media type of a link to which the mobile node 1 is connected. That is, the MIH function layer 20 supports a handover between different links, without regard to the type of a link interface corresponding to the lower layer 10. The MIH function layer 20 includes a Media-independent Event Service (MIES) module 22, a Media-Independent Information Service (MIIS) module 24, and a Media-independent Command Service (MICS) module 26.

The MIES module 22 checks whether the mobile node 1 has generated an event related to a handover among various links and reports generation of the event to the upper layer 30. More specifically, the MIES module 22 requests the mobile node 1 to register the corresponding node so that the corresponding node 4 can receive the report on the generation of the event, and determines whether an event occurs by receiving a message informing the generation of the event from the mobile node 1 which the corresponding node 4 is registered to.

The MIIS module 24 obtains information regarding the mobile node 1's handover between different links, either from the information servers 5 and 6 or from a PoA that collects information regarding a handover between different links performed by the mobile node 1. The MICS module 26 controls a handover at the lower layer 10, that is, at a link layer, according to a command input from the upper layer 30, such as a command input by a user.

A handover apparatus and a method according to an embodiment of the present invention are particularly related to the MIIS module 24. The MIIS module 24 receives a PoA capabilities IE which is information of the capabilities of a new PoA, and evaluates a network environment through the new PoA by using the PoA capabilities IE.

Figure 3:
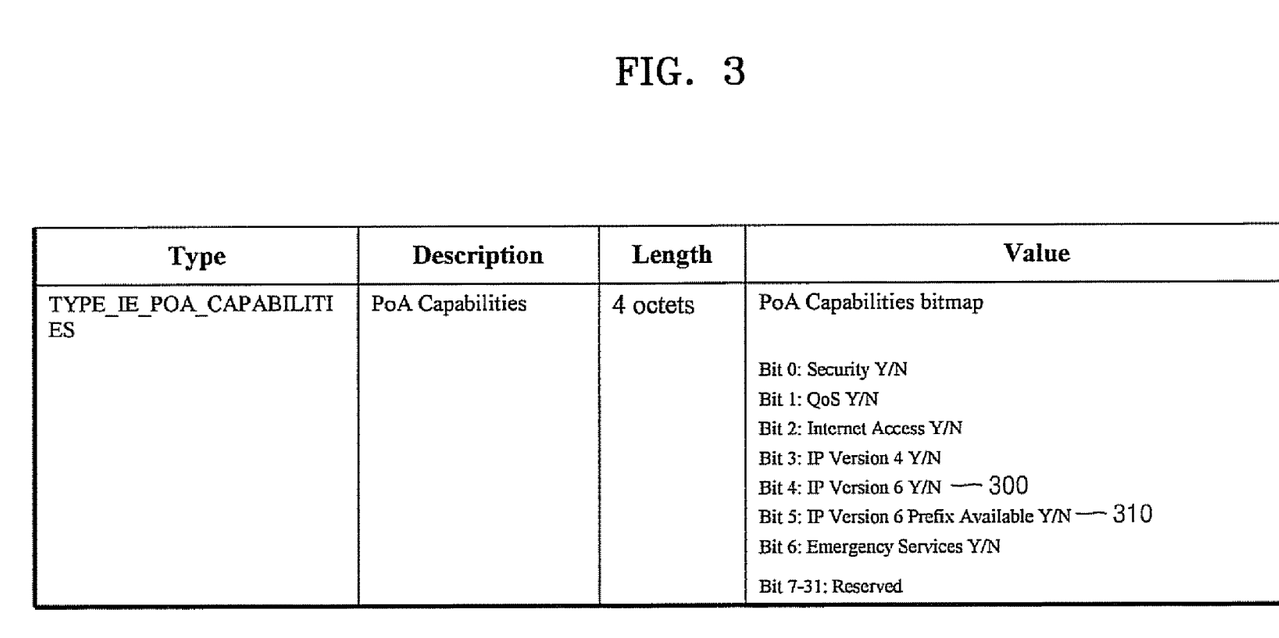
FIG. 3 is a table illustrating the particulars of a point of attachment capabilities information element (PoA capabilities IE) according to an embodiment of the present invention.

FIG. 3 is a table illustrating the content of a PoA capabilities IE according to an embodiment of the present invention. The PoA capabilities IE includes an IPv6 field 300 in its $4^{th}$ bit indicating whether a new PoA supports IPv6 and an IPv6 prefix available field 310 in its $5^{th}$ bit indicating whether an IPv6 prefix is available at the new PoA. The MIIS module 24 may determine whether a new PoA supports IPv6 by using the IPv6 field 300 and may determine whether an IPv6 prefix is available at the new PoA by using the IPv6 prefix available field 310.

Figure 4:
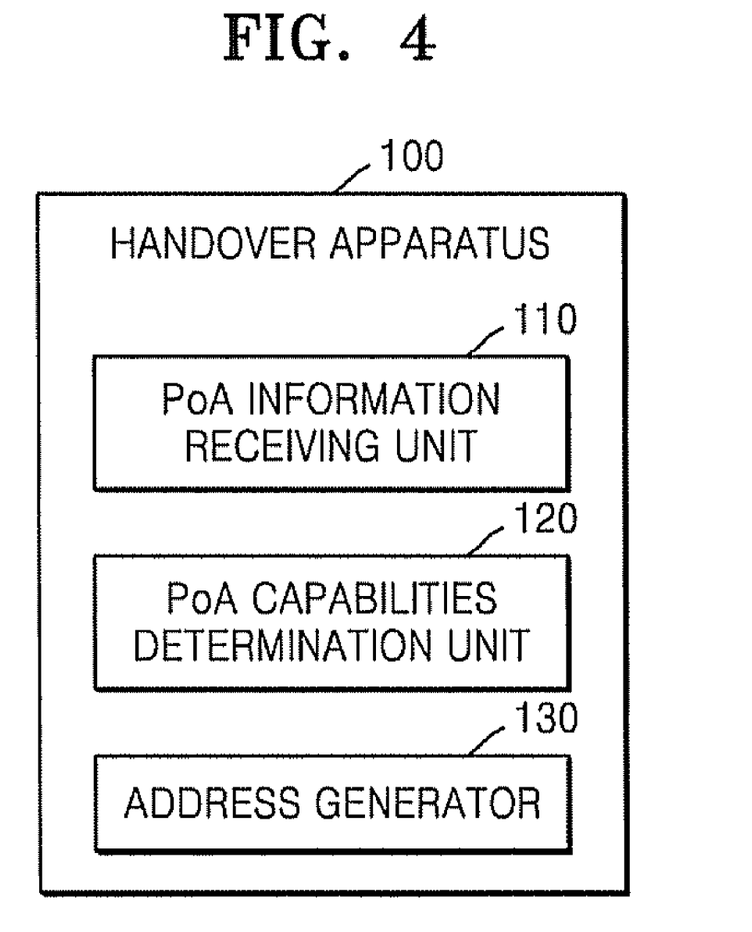
FIG. 4 is a block diagram of a handover apparatus according to an embodiment of the present invention.

FIG. 4 is a block diagram of a handover apparatus 100 according to an embodiment of the present invention. The handover apparatus 100 may include a PoA information receiving unit 110, a PoA capabilities determination unit 120, and an address generator 130.

The PoA information receiving unit 110 receives information regarding a new PoA. The PoA capabilities determination unit 120 determines, based on the information received regarding the new PoA, whether the new PoA supports IPv6 and whether an IPv6 prefix is available at the new PoA. As described above, the PoA capabilities determination unit 120 may be embodied in the MIIS module 24 of FIG. 2 but is not limited thereto. For example, the PoA capabilities determination unit 120 may be realized as a module outside the MIIS module 24.

The address generator 130 generates an address, i.e., a CoA, which a mobile node will use in a data communication with the new PoA. Generating the CoA is determined according to whether the new PoA supports IPv6 and whether IPv6 prefix is available at the new PoA. If the new PoA supports IPv6 and an IPv6 prefix is available at the PoA, the CoA is generated using automatic address configuration of IPv6. If the new PoA supports IPv6 but an IPv6 prefix is not available at the new PoA, the CoA is generated using DHCPv6.

Figure 5:
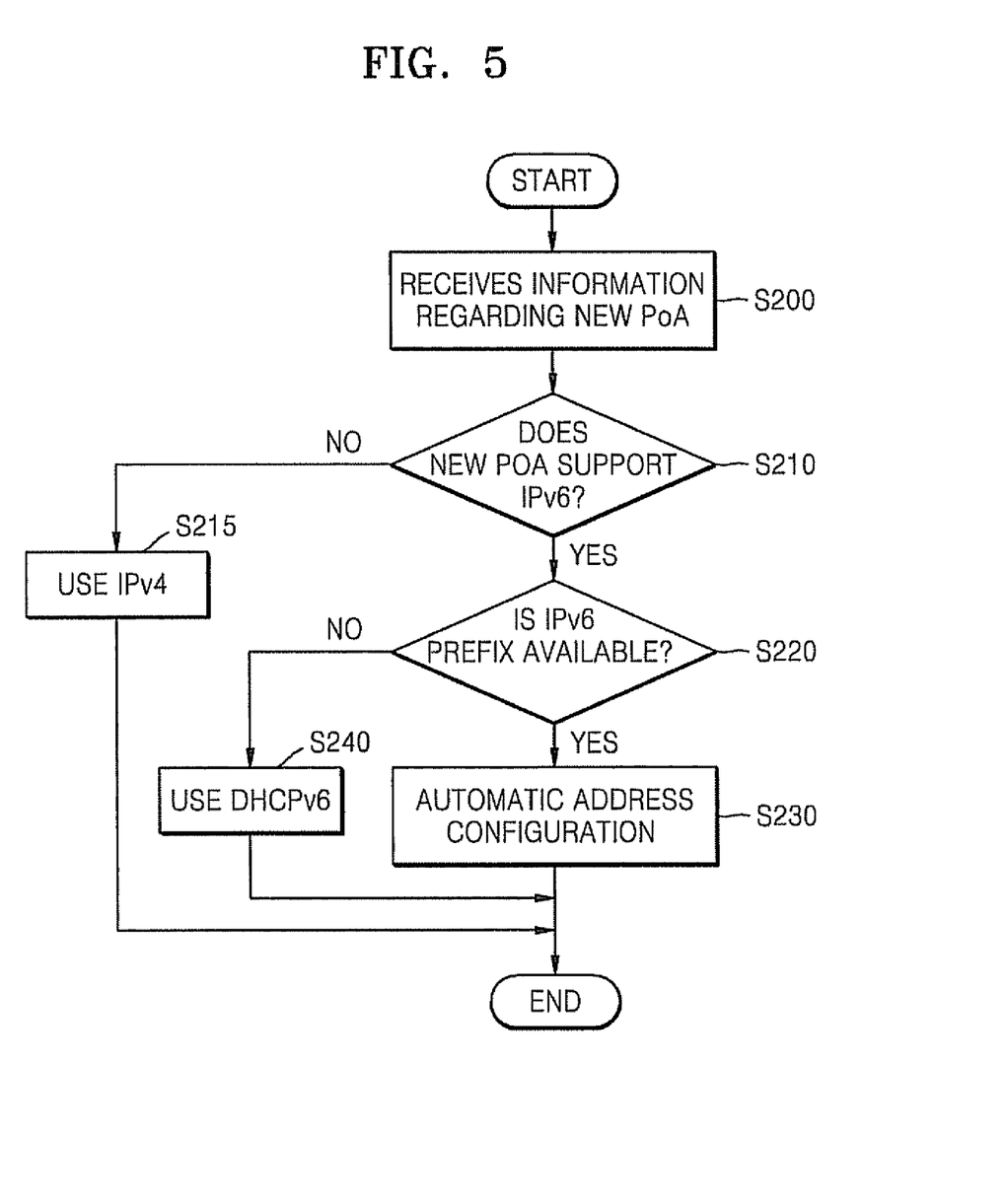
FIG. 5 is a flowchart illustrating a handover method according to an embodiment of the present invention.

FIG. 5 is a flowchart illustrating a handover method according to an embodiment of the present invention. Specifically, the PoA information receiving unit 110 shown in FIG. 4 receives a PoA capabilities IE to obtain information regarding a new PoA (S200).

The PoA capabilities determination unit 120 learns the capabilities of the new PoA in order to generate an address. First, the PoA capabilities determination unit 120 uses the 4th bit of the PoA capabilities IE (S210) to determine whether the new PoA supports IPv6. If the new PoA does not support IPv6, the mobile node 1 establishes a communication by using the new PoA and IPv4 (S215). Communication using IPv4 is well known to the technical fields to which the present invention pertains, and thus, a description thereof will be omitted.

If the new PoA does support IPv6, the PoA capabilities determination unit 120 determines whether an IPv6 prefix is available at the new PoA (S220). If an IPv6 prefix is available at the new PoA, the address generator 130 generates a CoA according to automatic address configuration (S230). Accordingly, an RA message is received from the new PoA and a 128-bit IPv6 address is created by combining the 64-bit IPv6 prefix contained in the RA message and a 64-bit lower address generated by the mobile node.

If an IPv6 prefix is not available at the new PoA, the address generator 130 generates a CoA using a technique that does not use IPv6 prefixes, for example, using DHCPv6 or using an address predetermined by a user (S240).

The present invention can be embodied as code, which can be read by a computer (any device capable of processing information), in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on.

As described above, in a handover apparatus and method according to aspects of the present invention, whether an IPv6 prefix is available at a new PoA can be determined based on PoA capabilities IE, prior to receiving an RA message. Accordingly, it is possible to prepare for DHCPv6 that does not use an IPv6 prefix, and prevent transmission of an unnecessary RS message. Also, since there is no need to wait for an RA message or to transmit an RS message, it is possible to prevent unnecessary delays during a handover. Furthermore, it is possible to use network bandwidth for a handover efficiently by preventing transmission of an unnecessary RS message.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of performing a handover in a mobile node which establishes a data communication through a point of attachment (PoA), the method comprising:

receiving information regarding capabilities of a new PoA, the information including an IPv6 prefix available field indicating whether an Internet Protocol version 6 (IPv6) prefix is available at the new PoA;

determining whether the IPv6 prefix is available at the new PoA, based on the IPv6 prefix available field; and generating an address to be used by the mobile node in a data communication with the new PoA based on whether the IPv6 prefix is available at the new PoA, wherein the receiving the information regarding the capabilities of the new PoA comprises receiving a PoA capabilities information element which contains the information regarding the capabilities of the new PoA, wherein the PoA capabilities information element comprises a value field representing the information regarding the capabilities of the new PoA in a form of a bit map, wherein a fifth bit of the value field comprises an IPv6 prefix available field indicating whether the IPv6 prefix is available at the new PoA.

2. The method of claim 1, wherein:

the receiving of the information regarding the capabilities of the new PoA comprises receiving a PoA capabilities information element from an information server which provides information regarding the handover.

3. The method of claim 2, wherein the PoA capabilities information element further comprises:
- a type field identifying the PoA capabilities information element; and
- a length field indicating the length of information contained in the PoA capabilities information element.

4. The method of claim 1, wherein the generating of the address using a technique that does not use IPv6 prefixes comprises:
- generating the address to be used by the mobile node by using dynamic host configuration protocol version 6 or by using an address predetermined by a user when the IPv6 prefix is not available at the new PoA.

5. An apparatus to perform a handover in a mobile node which establishes a data communication through a point of attachment (PoA), the apparatus comprising:
- a PoA information receiving unit to receive information regarding capabilities of a new PoA, the information including an IPv6 prefix available field indicating whether an Internet Protocol version 6 (IPv6) prefix is available at the new PoA;
- a PoA capabilities determination unit to determine whether the IPv6 prefix is available at the new PoA based on the IPv6 prefix available field; and
- an address generator to generate an address to be used by the mobile node in a data communication with the new PoA based on whether the IPv6 prefix is available at the new PoA,
- wherein the PoA information receiving unit receives a PoA capabilities information element which contains the information regarding the capabilities of the new PoA,
- wherein the PoA capabilities information element comprises a value field representing the information regarding the capabilities of the new PoA in a form of a bit map,
- wherein a fifth bit of the value field comprises an IPv6 prefix available field indicating whether the IPv6 prefix is available at the new PoA.

6. The apparatus of claim 5, wherein the PoA information receiving unit receives a PoA capabilities information element from an information server which provides information regarding the handover.

7. The apparatus of claim 6, wherein the PoA capabilities information element further comprises:
- a type field identifying the PoA capabilities information element; and
- a length field indicating the length of information contained in the PoA capabilities information element.

8. The apparatus of claim 5, wherein:
- when the IPv6 prefix is not available at the new PoA, the address generator generates the address to be used by the mobile node by using dynamic host configuration protocol version 6 or by using an address predetermined by a user.

9. A non-transitory information storage medium having recorded thereon computer-executed instructions to perform a method comprising:
- receiving a message having information regarding capabilities of a new point of attachment (PoA), the information including an IPv6 prefix available field indicating whether the IPv6 prefix is available at the new PoA; and
- performing a handover based on the message,
- wherein the message comprises a PoA capabilities information element containing the information regarding the capabilities of the new PoA,
- wherein the PoA capabilities information element comprises a value field representing the information regarding the capabilities of the new PoA in a form of a bit map,
- wherein a fifth bit of the value field comprises an Internet protocol version 6 (IPv6) prefix available field indicating whether an IPv6 prefix is available at the new PoA.

10. The information storage medium of claim 9, wherein the PoA capabilities information element further comprises:
- a type field identifying the PoA capabilities information element;
- a length field indicating the length of information contained in the PoA capabilities information element.

11. A non-transitory computer readable medium having computer-executable instructions for performing a method to reduce delays during a handover caused by router advertisement or router solicitation messages, the method comprising:
- receiving information regarding capabilities of a new PoA, the information including an IPv6 prefix available field indicating whether Internet Protocol version 6 (IPv6) prefix is available at the new PoA;
- determining whether the IPv6 prefix is available at the new PoA, based on the received information; and
- generating an address to be used by the mobile node in a data communication with the new PoA,
- wherein the receiving the information regarding the capabilities of the new PoA comprises receiving a PoA capabilities information element which contains the information regarding the capabilities of the new PoA,
- wherein the PoA capabilities information element comprises a value field representing the information regarding the capabilities of the new PoA in a form of a bit map,
- wherein a fifth bit of the value field comprises an IPv6 prefix available field indicating whether the IPv6 prefix is available at the new PoA.

12. The computer-readable medium according to claim 11, wherein:
- the receiving of the information regarding the capabilities of the new PoA comprises receiving a PoA capabilities information element from an information server which provides information regarding the handover.

13. The computer readable medium according to claim 12, wherein the PoA capabilities information element further comprises:
- a type field identifying the PoA capabilities information element; and
- a length field indicating the length of information contained in the PoA capabilities information element.

14. The computer readable medium according to claim 11, wherein the generating of the address using a technique that does not use IPv6 prefixes comprises:
- generating the address to be used by the mobile node by using dynamic host configuration protocol version 6 or by using an address predetermined by a user, when the IPv6 prefix is not available at the new PoA.

15. A network, comprising:
- a mobile device to receive information about capabilities of a new point of attachment (PoA), the information including an IPv6 prefix available field indicating whether the IPv6 prefix is available at the new PoA, and to generate an address based on the IPv6 prefix available field, without having to wait for a router solicitation or a router advertisement message; and
- an information server to transmit to the mobile node the information about capabilities of the new PoA,
- wherein the information server comprises a point of attachment (PoA) information transmitting unit to transmit the information regarding the capabilities of a new PoA to the mobile node,
- wherein the PoA information transmitting unit transmits the PoA capabilities information element containing the information regarding the capabilities of the new PoA, the PoA capabilities information element comprising a value field representing the information regarding the capabilities of the new PoA in a form of a bit map,
wherein a fifth bit of the value field comprises an Internet protocol version 6 (IPv6) prefix available field indicating whether the IPv6 prefix is available at the new PoA.

16. The network according to claim 15, wherein the mobile device further comprises:
a PoA information receiving unit to receive the information regarding capabilities of the new PoA.

17. The network according to claim 16, wherein:
when the IPv6 prefix is not available at the new PoA, the address generator generates the address to be used by the mobile node by using dynamic host configuration protocol version 6 or by using a predetermined user address.

18. The network according to claim 15, wherein the PoA capabilities information element further comprises:
a type field identifying the PoA capabilities information element; and
a length field indicating the length of information contained in the PoA capabilities information element.

19. The network according to claim 15, wherein:
the mobile node further comprises a media-independent handover function layer that includes a media-independent information service module; and
the PoA information transmitting unit transmits the information regarding the capabilities of the new PoA to the media-independent service module.

* * * * *